Jan. 18, 1938. H. F. NISSEN 2,105,698
APPARATUS FOR PROJECTING PICTURE OR SOUND FILMS
Filed May 14, 1936
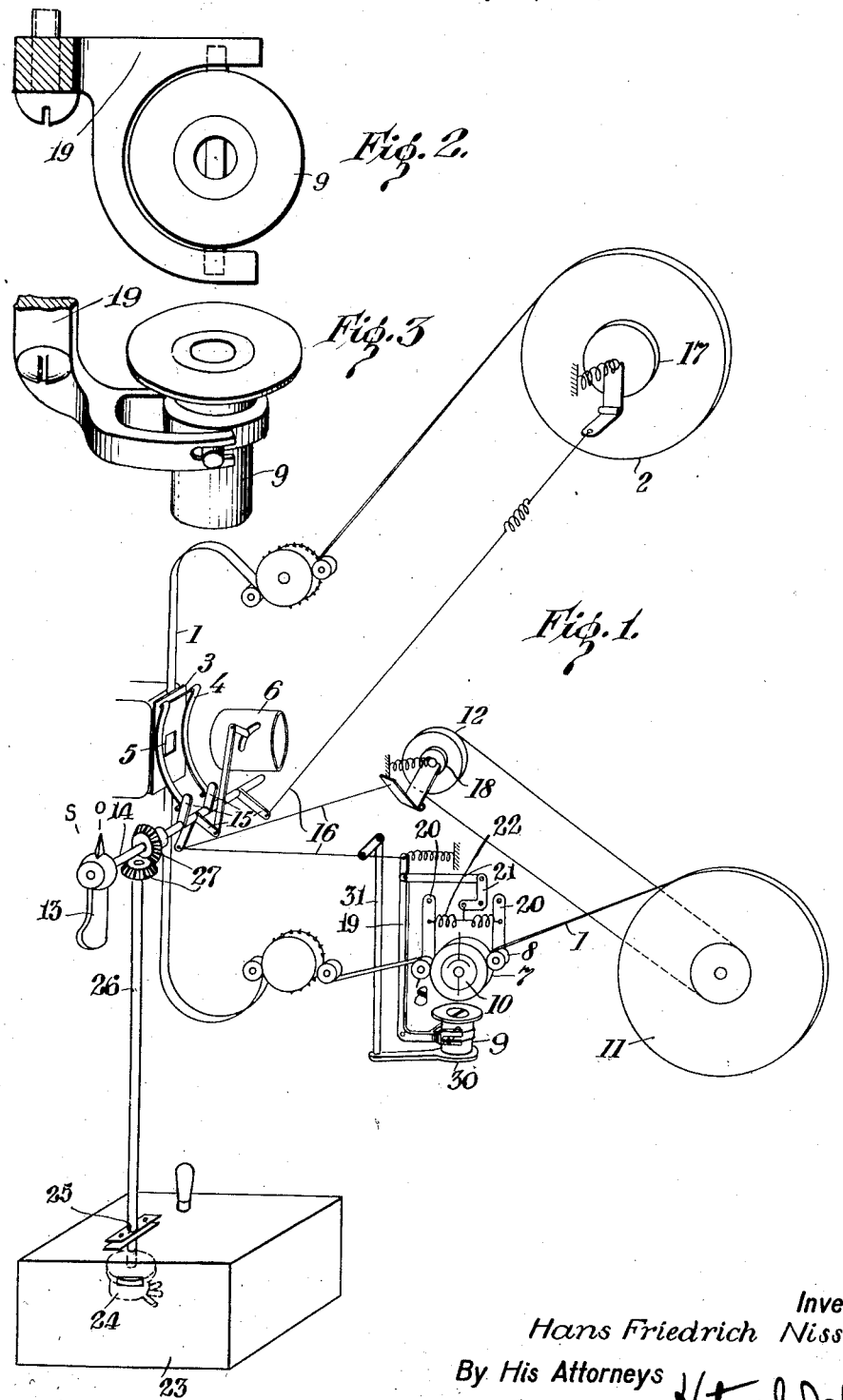
Inventor
Hans Friedrich Nissen
By His Attorneys Patented Jan. 18, 1938

2,105,698

UNITED STATES PATENT OFFICE 2,105,698

APPARATUS FOR PROJECTING PICTURE OR SOUND FILMS

Hans Friedrich Nissen, Dessau, Germany, assignor to I. G. Farbenindustrie Aktiengesellschaft, Frankfort-on-the-Main, Germany Application May 14, 1936, Serial No. 79,737
In Germany May 18, 1935

3 Claims. (Cl. 88—16.2)

This invention relates to an apparatus for projecting picture or sound films.

One of its objects is an apparatus for projecting alternatively at will different kinds of film, particularly films having different mechanical properties. Further objects will be seen from the detailed specification following hereafter.

Great difficulties have hitherto been associated with the use of a single projection apparatus for different kinds of films, especially films having different mechanical properties such as thickness and strength. If, for example, it is desired to run a film in which the light-sensitive material is a diazo-salt embedded in a layer of cellulose hydrate through the projection instead of a silver film it is absolutely necessary to have regard to the different properties of that film, especially its thickness and strength which differ from those of the silver film, if exposure of the film to considerable strain is to be avoided.

The present invention consists in a projection apparatus having means whereby a comparatively simple adjustment of the individual parts of the apparatus allows the use of the apparatus with different kinds of film.

The following expedients have proved to be advantageous:

(1) Alteration in the braking pressure on the winding-off drum;

(2) Alteration in the draft of the winding-on drum;

(3) Alteration in the pressure of the picture window;

(4) Sharp focussing of the picture.

Furthermore in the case of projecting sound films:

(5) Regulation of the friction of the film against the device for maintaining the speed of the film constant at the place at which the sound record is scanned, for the purpose of avoiding slipping of the film or too strong a draft on the film;

(6) Sharp adjustment of the optical sound-projection system;

(7) Insertion of a filter or the like in the course of the rays in the sound-projection system;

(8) Regulation of the degree of amplification of the amplifier.

It is not necessary in all cases to make use of all these expedients, and if required some or others of them can be dispensed with.

It is advantageous that one should be able to recognize the position of the individual parts of the apparatus for projecting a given film. For this purpose the alteration of the various parts of the projector may be caused by levers which all rotate in a given direction in setting the projector for a given film, for instance the construction may be such that when it is desired to project say a diazo-salt film each lever must be turned clockwise. The positions may, however, be indicated by particular locking devices or by marks which may be illuminated to render them more easily visible.

It is particularly advantageous to couple some or all of the adjusting devices with one another. It is possible in this manner to cause all the required adjustments of the parts of the apparatus by movement of a single handle. The various parts may be coupled in various ways. For example, there may be used rods, shafts or cords used in combination with levers, shafts, racks and so on, which may be selected according to the particular construction and nature of the movement desired. If individual parts, such for example as the amplifier and the sound apparatus, are detachable, suitable coupling links must be provided and arranged so that the movement of all the parts occurs simultaneously.

The aforesaid expedients will now be further explained, taking as an example the changing over from a silver film to a diazo-salt film.

The braking action on the film while it is being wound off and the draft on the film while it is being wound on can be varied, for example, by increasing or decreasing the frictional pressure on the winding-off and the winding-on drums by altering the tension of a spring in one direction or the other by a given amount. The pressure of the picture window may be altered in a similar manner. For focussing the picture sharply either the film guide or the objective may be moved. In changing from a silver film to a diazo-salt film and vice versa the movement must amount to approximately the thickness of the film support, exclusive of the layer, that is to say about 0.1 mm.

The alteration of the projector is of quite especial importance in the projection of sound films. If, for example, in changing from one film to another the draft on the film is diminished, in apparatus in which a flywheel is operated by the draft on the film the friction is reduced and the film may begin to slip which greatly detracts from the reproduction. This slipping can be avoided by inserting a pressure roller.

Furthermore, for instance, the sound-projection system must be adjusted differently for silver films and for diazo-salt films respectively. If the sound record is not sharply focussed the higher frequencies are reproduced only imperfectly or not at all. It is practically impossible to find the correct adjustment by trial at every change-over; hence an automatic adjustment of the sound-projection system is of particular value. By a particular arrangement of the sound projection system it is possible to produce the desired adjustment by means of a worm, an eccentric or a lever.

Since a blackened diazo-salt film is transparent for certain rays which affect the photo-electric cell it is advantageous to remove these rays by inserting a light filter in the course of the light. This may occur simultaneously with the sharp focusing by coupling the devices for actuating the parts in question with one another or with devices for causing the other adjustments.

Since the light is varied by a diazo-salt film less strongly than by a silver film, it is necessary to compensate the loss in volume of the sound by an increase in the degree of amplification. This can be brought about in a simple manner by adjustment of the amplifier control to a given extent.

In the accompanying drawing is shown diagrammatically a construction in accordance with the invention in which the devices for varying the different parts are coupled with one another.

Figure 1 is a side view of a projecting apparatus for sound and picture films.

Figures 2 and 3 are detail views of the sound projecting system and of an adjusting device therefor.

Referring to the drawing with more particularity, it shows that:

1 is the film,
2 is the winding-off drum,
3 is the film guide having the pressure device 4,
5 is the picture window,
6 is the projection objective,
7 is a film guiding roller coupled with a flywheel and provided with pressure rollers 8 mounted on pressure-adjusting levers 20; on the roller 7 the sound record is scanned by means of the sound objective 9 and the photo-electric cell 10,
11 is the winding-on drum,
12 is a wheel transmitting the drive to the winding-on drum,
23 is an amplifier with a control means 24 and
30 is a light filter to be inserted in the path of the rays of the optical sound producing system.

The adjustment of the parts of the apparatus is caused by means of the lever 13. There are shown in the drawing two fixed positions for the lever, one marked O for the projection of a diazo-salt film, and the other marked S for the projection of a silver film. Movement of the lever 13 from one position to the other rotates the shaft 14 to which it is fixed thus moving the levers 15 which are fixed to this shaft. The rotation of these levers 15, as will be seen from the drawing, varies the pressure of the device 4 on the film guide and alters the setting of the objective 6. At the same time by the cords 16 there are altered the pressure of the braking disc 17 on the winding-off drum 2 and the pressure of the braking disc 18 on the driving roller 12, while by means of the lever 19 the sound-projection objective is sharply focused for the new film. At the same time by means of the levers 21 and of the springs 22 the pressure of the rollers 8 is adjusted and by means of the lever 31 the filter 30 is inserted before the optical sound projecting system 9. The bevel gear wheels 27 serve to adjust the control means 24 of the amplifier 23 by means of the pole 26 and the coupling 25. Thus by a single movement of the lever 13 all the necessary adjustments are produced.

What I claim is:

1. An apparatus for projecting picture and sound films comprising in combination, a winding-off drum, means for braking said winding-off drum, means for altering the pressure of said braking means on said winding-off drum, a winding-on drum, means for driving said winding-on drum, means for altering the draft of said winding-on drum, a picture window and a gate, means for pressing said picture window against said gate, and means for altering the pressure of said picture window against said gate, an objective for focusing the picture, means for adjusting said objective to sharp focusing, a sound drum for scanning a sound record, pressure rollers for pressing a sound film against said sound drum, means for altering the pressure of said pressure rollers, an optical sound-projection system, means for sharp adjustment of said system, and means for controlling simultaneously all the altering and adjusting means to adapt the devices controlled by the latter to the particular kind of film fed through the apparatus.

2. An apparatus for projecting picture and sound films comprising in combination, a winding-off drum, means for braking said winding-off drum, means for altering the pressure of said braking means on said winding-off drum, a winding-on drum, means for driving said winding-on drum, means for altering the draft of said winding-on drum, a picture window and a gate, means for pressing said picture window against said gate, and means for altering the pressure of said picture window against said gate, an objective for focusing the picture, means for adjusting said objective to sharp focusing, a sound drum for scanning a sound record, pressure rollers for pressing a sound film against said sound drum, means for altering the pressure of said pressure rollers, an optical sound-projection system, means for sharp adjustment of said system, a filter for insertion in the trace of the rays of said sound-projection system, means for inserting said filter in the trace of said rays, and means for controlling simultaneously all the altering and adjusting means to adapt the devices controlled by the latter to the particular kind of film fed through the apparatus.

3. An apparatus for projecting picture and sound films comprising in combination, a winding-off drum, means for braking said winding-off drum, means for altering the pressure of said braking means on said winding-off drum, a winding-on drum, means for driving said winding-on drum, means for altering the draft of said winding-on drum, a picture window and a gate, means for pressing said picture window against said gate, and means for altering the pressure of said picture window against said gate, an objective for focusing the picture, means for adjusting said objective to sharp focusing, a sound drum for scanning a sound record, pressure rollers for pressing a sound film against said sound drum, means for altering the pressure of said pressure rollers, an optical sound-projection system, means for sharp adjustment of said system, an amplifier, means for regulating said amplifier, and means for controlling simultaneously all the altering and adjusting means to adapt the devices controlled by the latter to the particular kind of film fed through the apparatus.

HANS FRIEDRICH NISSEN.